(12) United States Patent
Lee et al.

(10) Patent No.: US 9,393,981 B1
(45) Date of Patent: Jul. 19, 2016

(54) FOLDABLE CART WITH REAR GUIDANCE ARRANGEMENT

(71) Applicants: Chunghsin Lee, Las Vegas, NV (US); Jian Zhang, Brookline, MA (US)

(72) Inventors: Chunghsin Lee, Las Vegas, NV (US); Jian Zhang, Brookline, MA (US)

(73) Assignee: FTR Systems, Inc, Las Vegas, NV (US)

( * ) Notice: Subject to any disclaimer, the term of this patent is extended or adjusted under 35 U.S.C. 154(b) by 0 days.

(21) Appl. No.: 14/544,795

(22) Filed: Feb. 17, 2015

(51) Int. Cl.
*G05D 3/00* (2006.01)
*B62B 5/00* (2006.01)
*B62B 3/02* (2006.01)
*G05D 1/02* (2006.01)

(52) U.S. Cl.
CPC ............... *B62B 5/0076* (2013.01); *B62B 3/02* (2013.01); *B62B 5/0033* (2013.01); *G05D 1/028* (2013.01); *G05D 1/0276* (2013.01)

(58) Field of Classification Search
None
See application file for complete search history.

(56) References Cited

U.S. PATENT DOCUMENTS

2015/0198440 A1* 7/2015 Pearlman .............. G01S 17/023
356/4.01

* cited by examiner

*Primary Examiner* — Adam Alharbi
(74) *Attorney, Agent, or Firm* — Don Halgren

(57) ABSTRACT

A foldable cart assembly having a user tracking arrangement so as to autonomously precede the movement of a user or follow movement instructions of the user during motion over a field. The cart assembly has a plurality of ultrasound and RF sensors in communication with corresponding sensors in a remote handset transmission device carried by the user. The sensors provide timing, direction and distance information to a central processor on the cart for instructing individual electrical motors empowering the respective direction and speed of rotation of the cart's wheels.

18 Claims, 7 Drawing Sheets

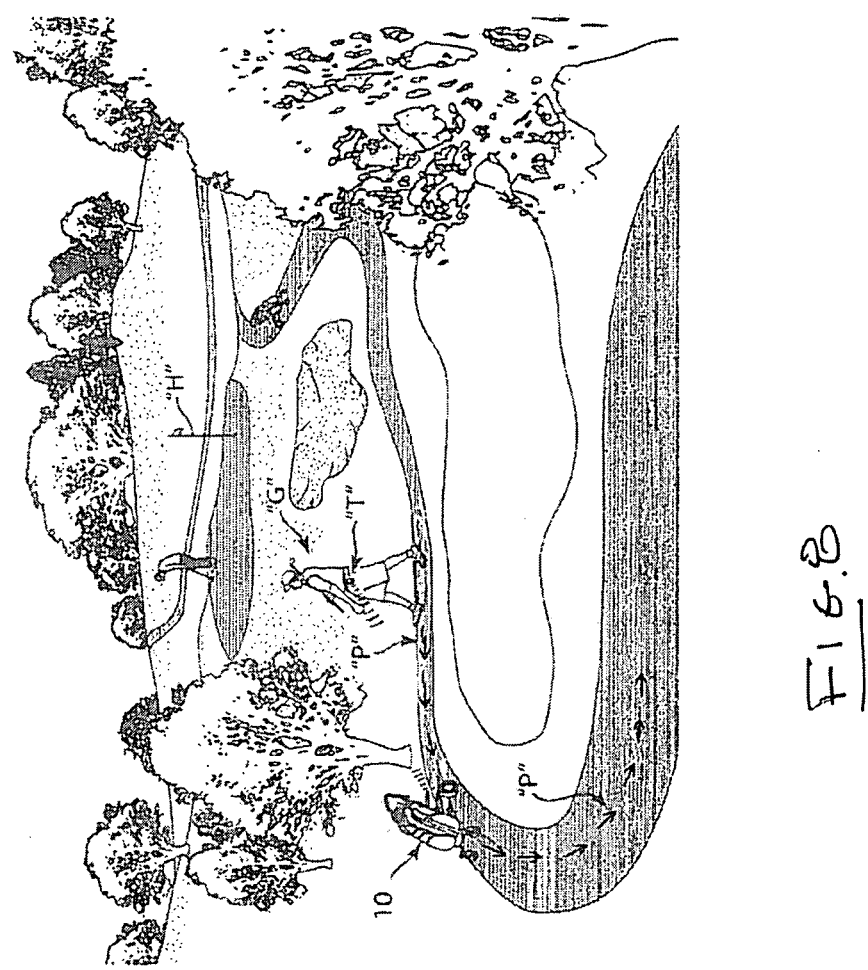

FOLDABLE CART WITH REAR GUIDANCE ARRANGEMENT

NON PROVISIONAL PATENT APPLICATION

The present application relates to portable, foldable, wireless signal-following trackable carts which may be utilized as golf carts, as grocery carts, as supply carriages or as delivery vehicles, farm vehicles/equipment and in medical facilities for tracking transportation therewithin, and is a Continuation-In-Part application of application Ser. No. 13/573,035, filed 15 Aug. 2012, now U.S. Pat. No. 8,955,870, which is a sister application of co-referenced application Ser. No. 13/573,036, also filed 15 Aug. 2012, now U.S. Pat. No. 8,789,638, which applications/patents are based upon our commonly U.S. Provisional Patent Applications No. 61/633,359, filed Feb. 9, 2012, and 61/628,039, filed Oct. 21, 2011, each/all being incorporated herein by reference in their entirety.

DISCUSSION OF THE PRIOR ART

Foldable and collapsible carts and particularly collapsible golf carts have been around for many years. Examples may be seen for instance and U.S. Pat. No. 5,749,424 to Reimers; U.S. Pat. No. 4,793,622, to Sydlow; and U.S. Pat. No. 4,418,776 to Weirick. Some of these carts are even self powered, as for example U.S. Pat. No. 4,106,583 to Nemeth and of course the "Segway"™ vehicle shown in U.S. Pat. No. 7,958,961 to Schade. These prior art carts are limited in their foldability and the collapsability, wherein their ultimate collapsed size would not permit them for instance to be carried aboard an airliner and stored in an overhead compartment. Further, the prior art fails to disclose a uniquely trackable, user-followable, user-precedable, collapsible cart as identified herein as the present invention.

It is thus an object of the present invention to overcome the disadvantages of the prior art.

It is a further object of the present invention to provide a mobile four wheeled cart arrangement capable of multiple down-size foldings, capable of minimal storage requirements.

It is yet a further object of the present invention to provide a mobile cart which is capable of tracking (following or preceding) a user yet staying within/along the same exact path the user has taken or will be taking.

It is yet another object of the present invention to provide an autonomous mobile cart which is capable by a first tracking means, of following the path as directed by the user, responsive to and according to a transponder carried by and controllable by the user.

It is still yet a further object of the present invention to have the cart circumnavigationally avoid obstacles in its path by a second automatic, directional control means.

BRIEF SUMMARY OF THE INVENTION

The present invention relates to a motor driven, autonomously directed and controlled, foldable cart assembly which articulates from a fully opened, supportive frame assembly into a compact and carryable mechanism which in one preferred embodiment could be stored for example, as a "carry on" for storage for example, in an overhead bin in an airliner, within a linear length of about 45 inches and autonomously guided on a path by a user, positioned behind the cart assembly.

The foldable cart assembly of the present invention comprises a lower base frame of aluminum or magnesium aluminum alloys having a first or front end and a second or rear end. The lower base frame in a first embodiment comprises a rail arrangement extending longitudinally from the front end to the rear end thereof. A pivot means is arranged generally at a midpoint of the base frame. A transverse axle member extends across the rear end of the lower base frame. A free wheeling coaster wheel is pivotally supported at each end of the rear end transverse axle member.

The lower base frame has the pivot arrangement along a mid-portion thereof, to permit articulation thereof. The front end of the lower base frame has an axle arrangement extending thereacross. A rotatably empowered, independently controlled wheel is arranged at each end of the front end's transverse axle arrangement.

Each independently controlled wheel at each end of the transverse axle arrangement is independently controlled by a microprocessor as to each wheel's speed and as to each wheel's independent direction of rotation, by each drive wheel having a computer controlled electronic drive motor there connected. A housing arranged supportively on the front end of the lower base frame encloses a control computer, the drive wheels' motor controls, and a power supply unit. The control computer within that housing receives information through a proper circuit, from a multiple sensor arrangement installed within the cart assembly.

A pair of upwardly directed, generally parallel, curved side bar frame members extend away from the pivot axis arrangement disposed at the mid-portion of the lower base frame arrangement. The upwardly directed curved side bar frame members have a distal end with a transverse support bar extending therebetween. This transverse support bar also functions as an interiorly tucked away carrying handle when the cart assembly is collapsed.

A pair of mid-frame members have a first (or lower) end which pivotally extend from the ends of the transverse support bar. The mid-frame members have a second (or upper) end which is attached to the mid-frame support axis. A "U" shaped handle is pivotally arranged onto the respective ends of the mid-frame support axis. A tightenable knob or hub is arranged at the juncture of the mid-frame members and the U-shaped handle so as to permit the adjustable securement into a fixed position that U-shaped handle with respect to the parallel, upwardly directed (during cart assembly use) mid-frame members, or into a down-folded orientation during carrying or storage of the cart assembly.

The lower base frame member has a strap arrangement to secure any baggage such as, for example, a golf club bag.

A generally L-shaped bracket is attached to a midpoint of each of the upwardly directable frame members and extend toward the front end of the cart assembly, and also extend generally parallel to the lower base frame arrangement. Each L-shaped bracket is spaced transversely apart from one another a specific distance, for computational purposes of the computer control unit. These L-shaped brackets include portions of the sensor arrangement within the cart assembly. Each L-shaped bracket has a distal end with an ultrasound sensor member of the multiple sensor arrangement preferably arranged therewithin.

The ultrasound sensor member component of the multiple sensor arrangement, in one preferred embodiment is arranged on/in the cart assembly for example, to detect tracking targets such as the user holding a tracking target device (handset), obstacles including sand pits, water and any sort of travel-blocking entity. A second sensor member, such as for example, an RF (radio frequency) sensor member, may also be arranged on/in the cart assembly or for example, in the housing, to function as a timer, to "set the clock" in conjunction with the monitoring of the ultrasound sensor arrangement's responses for following the ultrasound action, for ultrasound control of direction and position through the central processing unit for setting and controlling the cart assembly's direction (path) and speed. Precise tracking of positions of for example, a golfer using this cart arrangement, is accomplished by a pair of spaced apart ultrasound sensor transceivers in a phase differential manner, and by the ultrasound sensor array for detection and controlled avoidance of obstacles nearby or crossing the cart assembly's path. The ultrasound sensor arrangement is mounted in the spaced-apart manner on the frame of the cart and interacts with the RF transponder carried in a remote device by the cart's user. These transponders and the RF sensor arrangement continuously triangulate a signal between the cart and the remote device of the cart's user, so as to enable the precise tracking of a user's directions and or path by the cart assembly, because the cart's user is carrying the remote transponder.

Those ultrasound and RF transponders of the sensor arrangement are in proper electrical communication through a circuit connected with the control computer (CPU) preferably arranged within the housing which is secured at the second end portion of the lower frame member. The multi-sensor arrangement thus enables the cart assembly to autonomously follow or precede the path of, for example, someone leading or someone directing the way from the backside of the cart, such as for example, on a golf course, with a (remote control) location-transmitting transponder handset device. The transversely separated ultrasound sensors each send and receive a common signal relative to the location transmitting remote transponder device carried for example by a golfer or the like, whereupon the control computer triangulates that differentially received and timed return signal (with the RF sensor) with the target's (transponder) angle, so as to appropriately effect the rotation of the drive wheels, both as to the rotational direction and as to the rotational speed, thereby controlling the path to be taken by the cart assembly. Once the CPU performs its calculations, it effects the driving of the powered wheels which each have a microprocessor for effecting their respective speed and rotational direction.

The ultrasound signal generator arrangement (of the two sensor configuration) is mounted on the cart, and is in communication with the remote carried handset transponder and with the central processing unit (CPU), which CPU is also in communication with the two ultrasound transponders through the CPU. The cart arranged RF transponder provides a trigger time and permits the measure of the time between the return signals of the ultrasound transponders, so as to provide the basis of the CPU to instruct the independently empowered drive wheels as to direction of rotation and to speed of rotation. The ultrasound signal communication arrangement detects tracking targets, obstacles, water, sand traps, blockages, and they also provide a measurement of distance to an item. Based upon the travel time and sound speed, the CPU continuously calculates the path and the distance between the remote device carried by the cart's user and the sensor on the cart, using triangulation, the distance and direction between the cart and the cart user (i.e. golf player) may be determined, and provides proper instructions to be transmitted to the microprocessor controlled drive wheels, to properly maneuver the cart on the field of play to follow the user's path or follow the user's inputted RF instructions into the control handset for a path for the cart to follow preceding the user.

The control algorithm is based on that feedback from the sensors. By knowing the distance and direction at anytime (or all the time), the CPU keeps track of the player's walking path. For short distances, the CPU instructs the cart to closely follow the player's walking path. For longer distances, the CPU may provide commands to go to the player on a shorter path, and to follow the player within a proper distance.

The combined RF and ultrasound sensor arrangement thus provides proper feedback to the control computer (central processing unit-CPU) so that the control computer may also further control the direction of rotation and speed of each individual drive wheel so as to avoid obstructions in the path of the card assembly, yet still properly follow the location transmitting device through a non-linear path, if need be. Thus the modes of operation of the system of the present invention comprise: constant communication with user, the following of person "1" (user), and the trajectory followed, so the cart will avoid obstacles and not stray into the wrong territory, such as a pond, a tree or the like where the user would not have walked/traveled.

By way of explanation, ultrasonic range finding is use of ultrasound is also called sonar (sound navigation and ranging). This works similarly to radar (radio detection and ranging): An ultrasonic pulse is generated in a particular direction. If there is an object in the path of this pulse, part or all of the pulse will be reflected back to the transmitter as an echo and can be detected through the receiver path. By measuring the difference in time between the pulse being transmitted and the echo being received, it is thus possible to determine how far away the object is.

One aspect of the present invention is that the remote device may be instructed to send the cart ahead of the user, towards the next position, for example, the next "hole" on the golf course by manual input of movement directions or instructions to be undertaken in real time as the cart is moving, by input means into the remote device from the user/holder of the remote device to the RF transceiver on the cart. It is to be noted that the cart may also become a push cart when the power is turned off.

A fifth or "safety" wheel is pivotally supported off of a "J"-shaped axis extending longitudinally from a pivot arrangement on the second end of the cart assembly. The fifth wheel acts so as to prevent an overturn of the cart assembly if it were going up an incline or needed further balance.

The cart assembly is articulable so as to be folded inwardly upon itself about its various pivot axes so as to be collapsible into a very compact configuration. The U-shaped handle at the upper end of the parallel frame members may be pivoted about its transverse axis so as to swing in that U-shaped handle rearwardly or forwardly as necessary. The lower base frame is foldable about its pivot arrangement located along its mid-portion. The upwardly directed frame members, having that transverse pivot axis arranged about one third of the way up from the lower base member may in itself be pivoted around that transverse pivot axis to further compact the cart assembly.

The entire cart assembly is ultimately carryable by the transverse pivot axis arranged between the upwardly directed frame members, thus functioning as a carry handle.

The invention thus comprises a foldable four wheeled load carryable cart assembly system comprising: an elongated lower base frame arrangement having a set of wheels on a first half-end thereof, and a set of empowered computer controlled drive wheels on a second half-end thereof; a plurality of pivotable frame portions extending from one side of the second half end, wherein the first half end and the second half end of the lower base frame arrangement is foldable about a generally centrally located pivot axis thereon, and the plurality of pivotable frame portions are foldable about a set of intermediate spaced-apart pivot axes to permit the cart assembly to be folded into a compact hand-carryable configuration;

and wherein the cart assembly system includes a wireless user-tracking arrangement thereon, and wherein the wireless user-tracking arrangement electronically instructs an onboard central processing unit computer to control the empowered drive wheels as to rotational direction and rotational speed, to permit the cart assembly to track and precede or follow movement of a system's user during a user's path of motion. The system includes a user-carryable wireless transponder for transmitting wireless signals about a user's location to the wireless user-tracking arrangement on the cart assembly. The tracking arrangement includes a pair ultrasound transponders arranged to communicate positional signals with the user-carryable wireless transponder. The tracking arrangement includes a radio frequency transceiver for providing timing for ultrasound signals utilized by the central processing unit computer in the cart assembly. The ultrasound sensor arrangement transmits obstacle-avoiding signals to the central processing unit computer for the cart assembly to avoid obstacles in the path of the cart assembly. The ultrasound sensors are supported in a horizontally spaced-apart configuration on one set of frame portions to provide communicated-signal triangulation capability to the onboard central processing unit computer. An independent drive motor is arranged for each drive wheel of the cart assembly.

The invention also includes a process for controlling the track, speed and direction of a collapsably foldable, central processor unit controlled, electronically motorized, individual drive wheeled, cart assembly system for use by a cart assembly user in a field of play, comprising: arranging a pair of spaced-apart wireless ultrasound transponders on a frame portion of the cart assembly; providing a carryable wireless location ultrasound transceiver device to a user of the cart assembly; sending a pair of corresponding ultrasound signals from the ultrasound transponders on the cart assembly to and receiving returned back ultrasound signals from the location transceiver device carried by a user; timing the pair of received ultrasound signals received back to the cart assembly by an onboard RF transponder; communicating the signals received by the ultrasound transponder and the RF transponder to the central processing unit computer; and triangulating the signals so as to govern the electronic instructions to the individual drive wheels for the cart assembly to follow the user carrying the transponder device. The method includes: sensing motion and direction of a remote device carried by a user of the system; instructing drive wheels on the cart pursuant to sensed direction, speed and distance of the user carrying the remote device; operating the carryable device as a remote control to instruct the cart assembly to a user-desired site. The instruction to the individual drive wheels from the central processing unit is different for each wheel. The instruction to the individual drive wheels includes an instruction to rotate at different speed from one another. The instruction to the individual drive wheels may include an instruction to rotate at different direction from one another.

The invention also comprises a collapsible wheeled load carryable autonomously mobile cart assembly system comprising: an articulable lower frame having at least two independently empowered drive wheels thereon; an articulable upper frame, with a first and a second sensor transponder arrangement thereon; and a central processing unit on the cart assembly to instruct the empowered drive wheels as to rotational requirements upon receipt of the central processing unit receiving time, direction and distance information from the first and second sensor transponder arrangement; a user carryable handset for receiving and for transmitting position signals with respect to the user and the cart assembly, wherein the first sensor arrangement consists of a pair of spaced apart ultrasound signal trasnponders for communication with an ultrasound transponder in the carryable handset. The first sensor arrangement consists of an RF signal transponder in communication with an RF transponder on the carryable handset. The RF signal transponder in the cart assembly provides a time stamp instruction to the ultrasound signals communicated to the central processing unit in the cart assembly. The articulable upper frame is divided into multiple sections for rotatable collapse into a hand carryable configuration with a collapsed lower frame therebeneath.

DESCRIPTION OF THE DRAWINGS

FIG. 8 is a representation of the cart assembly tracking and preceding a user along the user's desired path.

DETAILED DESCRIPTION OF THE INVENTION

Figure 1:
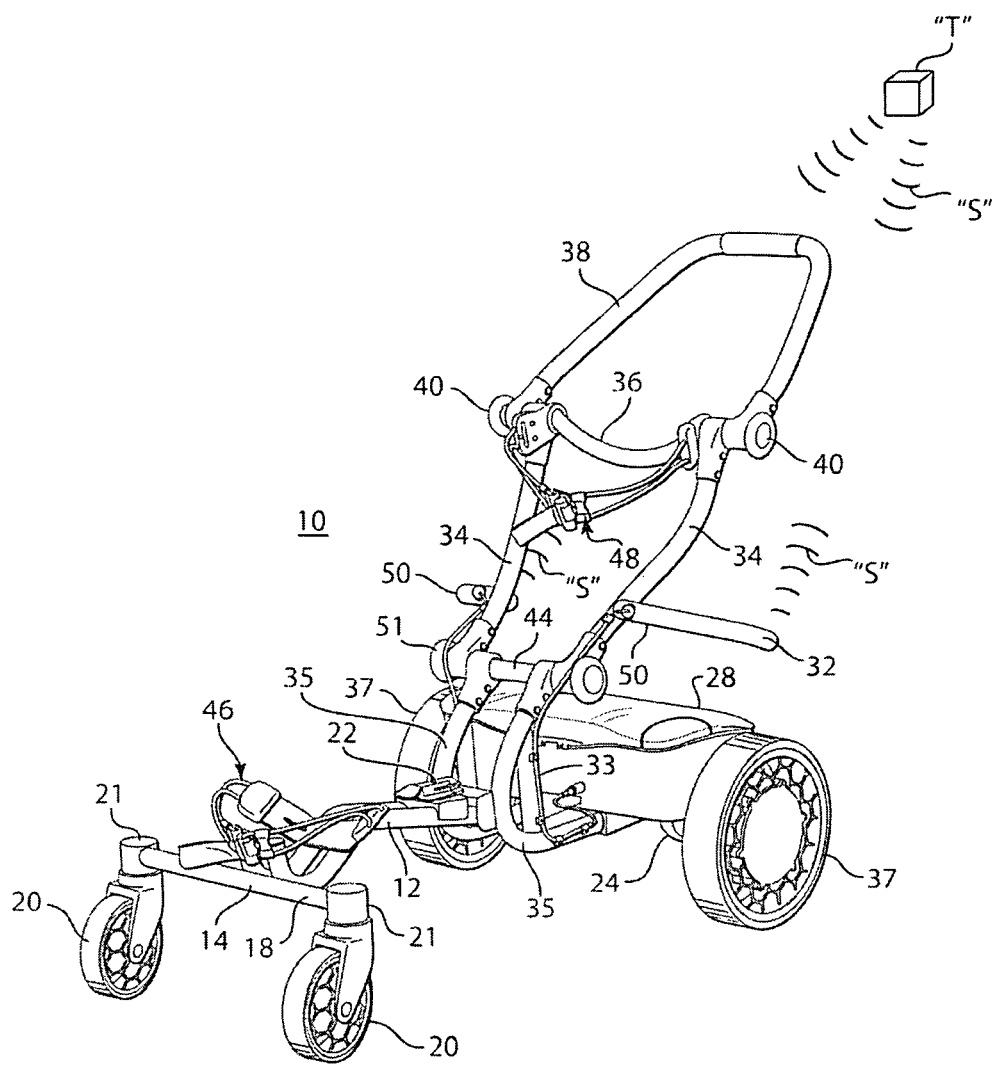
FIG. 1 is a perspective view of the tracking foldable cart assembly in an open and unloaded configuration.

Referring now to the drawings in detail, and particularly to FIG. 1, there is shown the present invention which comprises a computer controlled, motor driven, autonomous, directed and controlled, foldable cart assembly 10 which articulates from a fully opened, supportive frame assembly into a compact and carryable mechanism which in one preferred embodiment could be stored for example, as a "carry on" for storage, for example, in an overhead bin in an airliner, within a linear length of about 45 inches, as shown more closely, in the figures of our separate corresponding patent application, Foldablecart-10NonProv, application Ser. No. 13/573,035, now U.S. Pat. No. 8,955,870, incorporated herein by reference in its entirety.

The foldable cart assembly 10 of the present invention comprises a lower base frame 12 of aluminum or magnesium aluminum alloys having a first end 14 and a second end 16. The lower base frame 12 in a first embodiment comprises a rail arrangement extending longitudinally from the first end 14 to the second end 16 with a collapse pivot arrangement 22 at a midpoint thereof, as may be seen in FIG. 1. A transverse axle member 18 extends across the first end 14 of the lower base frame 12. A free wheeling coaster wheel 20 is pivotally supported at each end of the front transverse axle member 18.

The lower base frame 12 has the pivot arrangement 22 along a mid-portion thereof, to enable articulated collapsible-carry of the cart assembly 10. The second end of the lower base frame 16 has an axle arrangement 24 extending thereacross. A rotatably empowered, independently controlled wheel 37 is arranged at each end of the second end's transverse axle arrangement 24, as shown and described in our separate patent application, incorporated herein by reference in its entirety.

Figure 2:
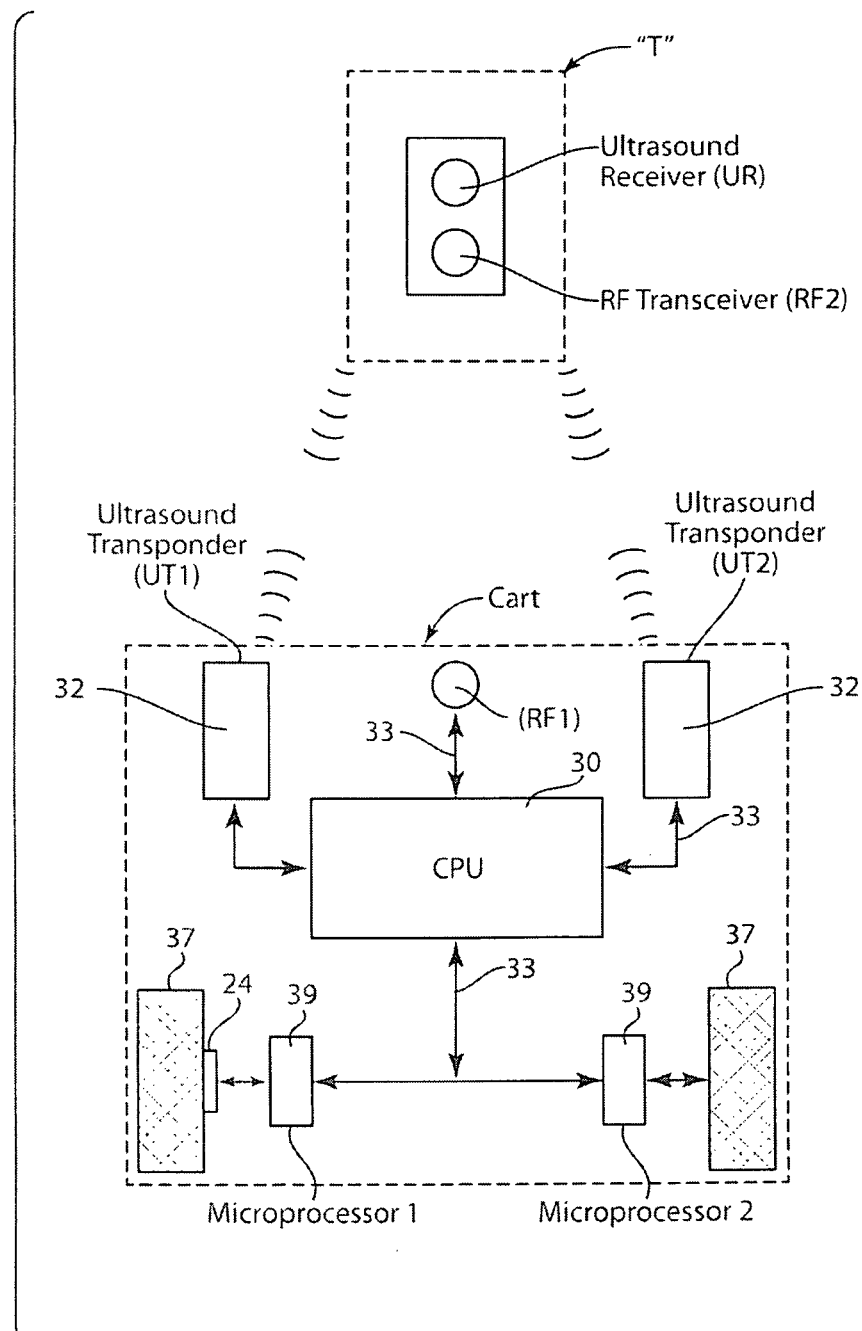
FIG. 2 is a schematic representation of the control system for the cart and the remote device held/carried by the cart's user.
Figure 3:
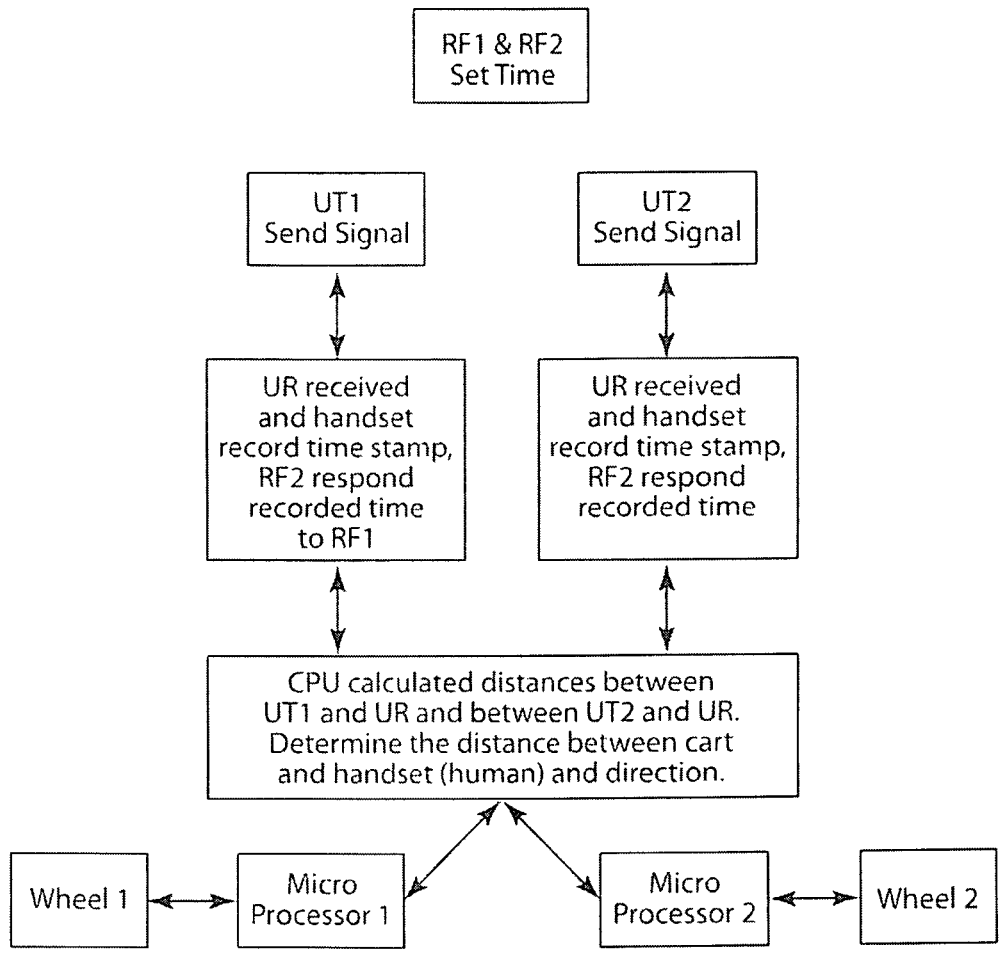
FIG. 3 is a flow chart relative to the schematic shown in FIG. 2.
Figure 4:
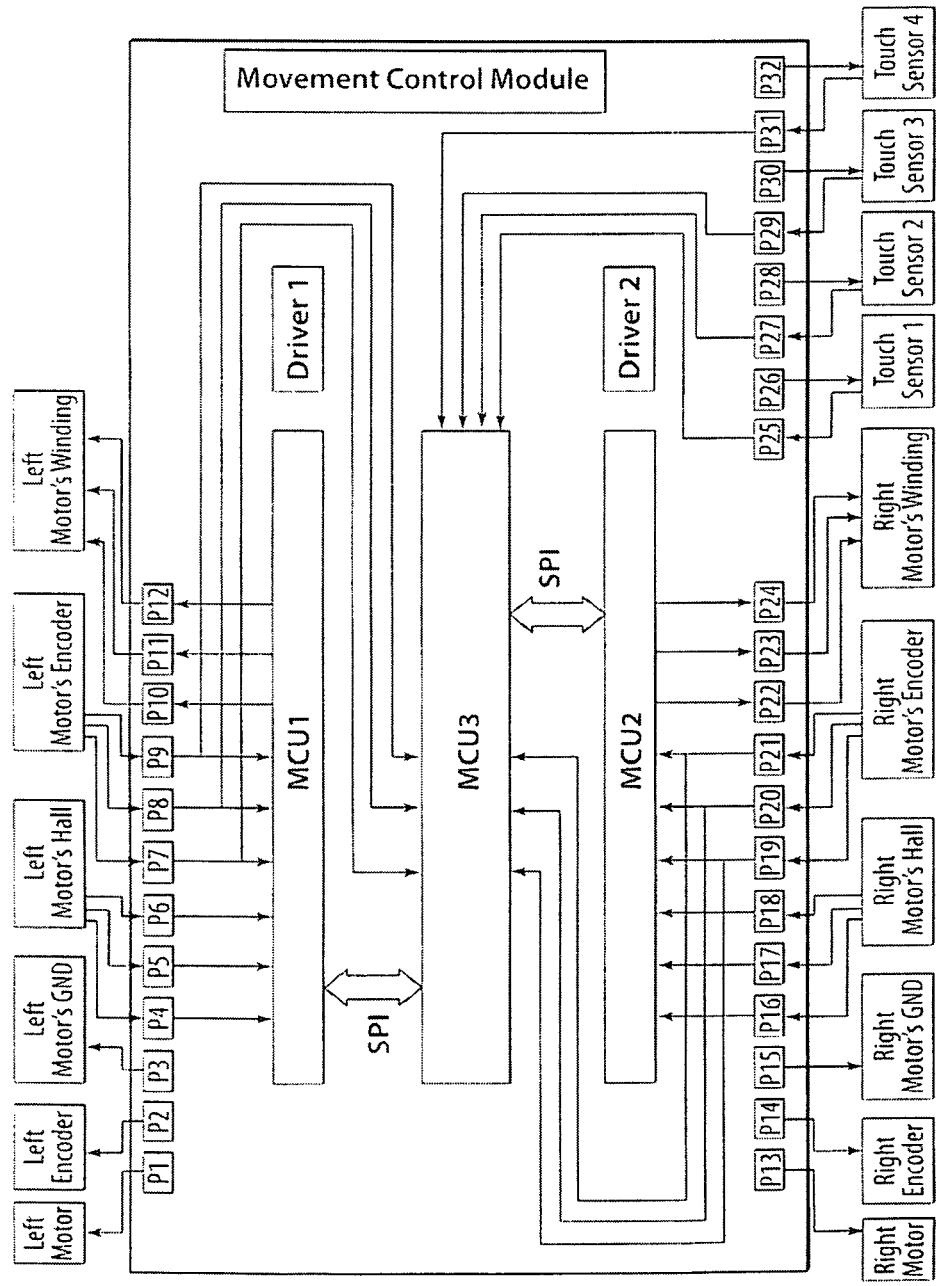
FIG. 4 is a depiction of the circuit for the movement control module.

Each independently controlled wheel 37 at each end of the transverse axle arrangement 24 is independently controlled by a microprocessor 39 being controlled by the central processing unit computer arrangement 30, (CPU—represented in FIG. 2), as to each wheel's speed and as to each wheel's independent direction of rotation, by each drive wheel 37 having its own computer controlled electronic drive motor. A housing 28 arranged supportively on the second end 16 of the lower base frame 12 encloses the control computer CPU arrangement 30, the drive wheels' motor controls, and a power supply unit, as represented in FIGS. 2, 3, 4, 5 and 6. The control computer arrangement 30 within that housing 28 receives information through a proper circuit 33, from a combinational sensor arrangement (UT1 & UT2) 32 and (RF1) 54, installed within the cart assembly 10, as represented in FIG. 3.

A generally L-shaped bracket 50 is attached to a midpoint of each of the upwardly directable mid-frame members 34 and extend toward the second end 16 of the cart assembly 10, and generally parallel to the lower base frame arrangement 12. Each L-shaped bracket 50 is spaced transversely apart from one another a specific distance, for computational purposes of the computer control unit 30. These L-shaped brackets 50 include the ultrasound transponder portions of the sensor arrangement 32 within the cart assembly 10. Each L-shaped bracket 50 has its distal end with the first ultrasound transponder 32 of the combined sensor arrangement (32 and 54), as represented in FIG. 2.

The second sensor member 54, such as for example, a radio frequency transponder/generator (RF) may also be arranged on/in the cart assembly 10 or for example, in the housing 28, for functioning as a timer or "clock" for the ultrasound transponders (UT1 and UT2) 32. By knowing the distance and direction of a player at anytime and at all time, during an activity, for example, a golf game, the microcomputer 30 can keep track of the player's "G" walking path "P", represented in FIG. 7 and FIG. 8. For short distances, the microprocessor 30 provides instructions to the independent microprocessor 39 controlled and motor 24 driven wheels 37 to follow or preceded the golfer "G" almost exactly. For a long distances, the microcomputer may provide instructions to the wheels 37 to follow a shorter path, all based upon feedback into the control algorithm from the sensors 32 and 54.

Figure 7:
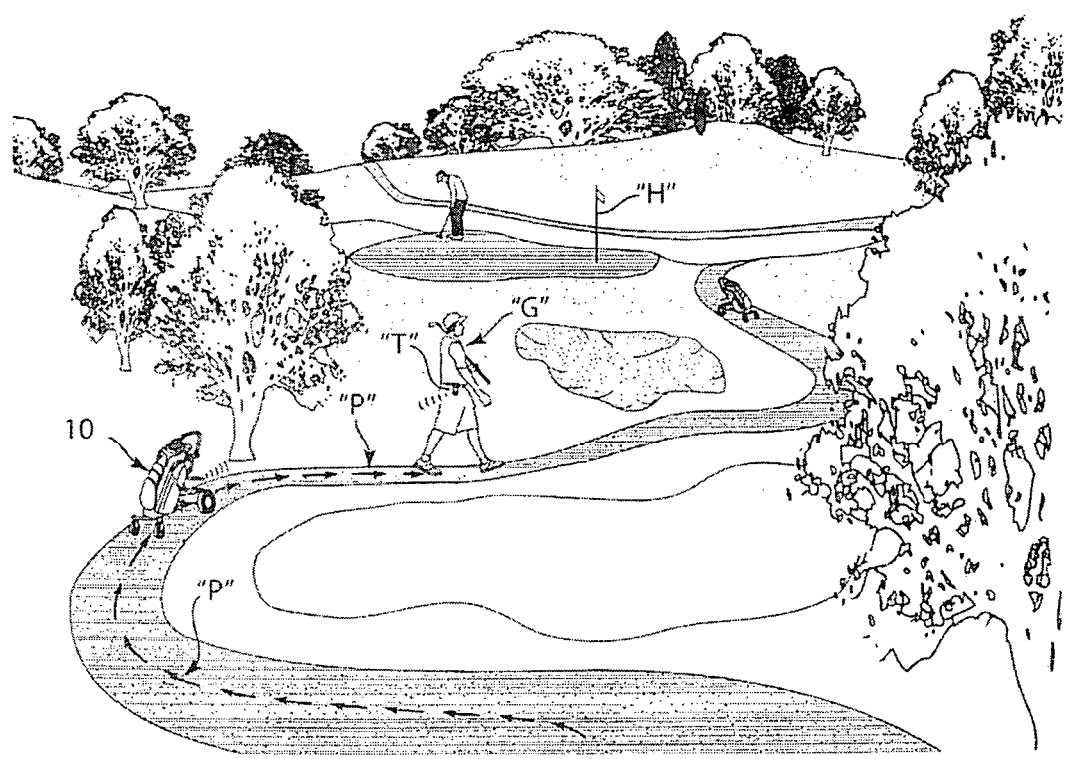
FIG. 7 is a representation of the cart assembly tracking and following a user along the user's path.

Precise tracking of continuous line of positions of for example, golfers using this cart arrangement, is accomplished by the ultrasound sensors (UT1 & UT2) 32 in a phase differential manner. The ultrasound sensor array 32 is utilized for detection and controlled avoidance of obstacles "O" nearby or crossing the cart assembly's path. The RF sensor arrangement 54 is mounted on the cart assembly 10 and interacts via RF signals sent and received with respect to an RF transponder in the remote handset device "T", represented in FIGS. 1 and 2, carried apart from the cart assembly 10 by the cart's user "G", as may be represented in FIG. 7. The transponder and the RF sensor arrangement continuously triangulates a signal "S", represented in FIG. 1, between the cart assembly 10 and the remote handset device "T" of the cart's user, so as to enable the precise establishing and the tracking of a path "P" by the cart assembly 10, of the cart's user "G" carrying the remote transponder "T" as represented in FIGS. 7 and 8.

Those first and second ultrasound transponders (UT1 & UT2) 32 of the sensor arrangement are in proper electrical communication through the circuit 33 connected with the control computer (CPU) 30 preferably arranged within the housing 28 which is secured at the second end 16 of the lower frame member 12. The multiple ultrasound sensor arrangement 32 thus enables the cart assembly to autonomously follow the path "P" of for example, someone leading the way, such as for example, on a golf course, with a (remote control) location-transmitting transponder device "T". The transversely separated first UT1 & UT2 sensors 32 each receive a timed common signal "S" from the location transmitting remote transponder device "T" carried for example by a golfer "G" or the like, whereupon the control computer CPU 30 triangulates that differentially received and timed (through the RF sensors time stamping) signal with the target's (transponder) angle, so as to appropriately effect the individually different rotation of the drive wheels 37, both as to rotational direction and as to rotational speed, thereby automatically steering and thus controlling the path "P" to be followed, i.e. taken by the cart assembly 10. Once the CPU/performs its calculations, it effects the driving of the individually powered wheels 37 which each have a microprocessor controlling their respective speed and rotational direction.

Figure 5:
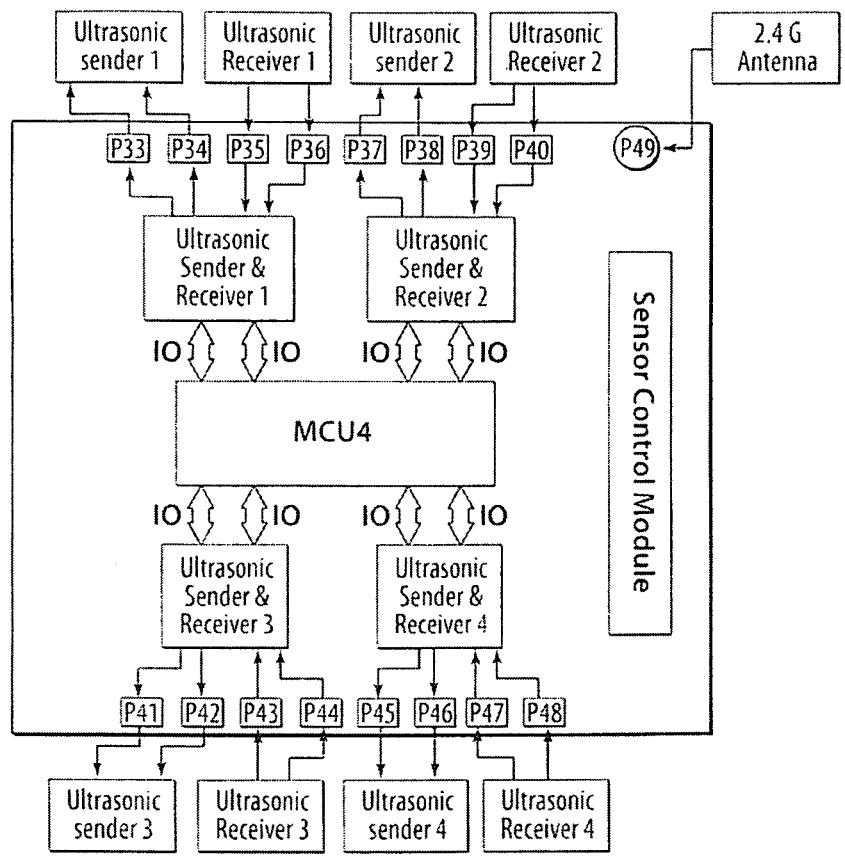
FIG. 5 is a depiction of the circuit for the sensor control module.
Figure 6:
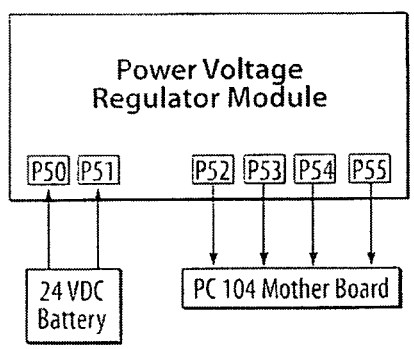
FIG. 6 is a representation of the circuit of the power voltage regulator module.

An RF signal generator arrangement (RF1) 54 (the second sensor configuration utilized in the present invention) is mounted in the cart assembly 10, and is in communication with an RF transceiver RF2 in the remote carried transponder "T" represented in FIGS. 2 and 5, and with the central processing unit (CPU), which CPU is also in communication with the two ultrasound transponders 32 through the computer control arrangement (CPU) 30. The RF transponder 54 provides a trigger time which permits the measurement of the time between the signals of the ultrasound transponders to provide the basis of the CPU to instruct the independently empowered drive wheels as to direction of rotation and to speed of rotation. The ultrasound signal communication arrangement (UT1 & UT2) 32 emits sound signals for radar-like detection and alerts the cart assembly 10 as to avoidance controls of tracking targets, obstacles, water, sand traps, blockages. The ultrasound signal communication arrangement 32 may also provide a measurement of distance to an item. Thus, based upon the travel time and sound speed, the CPU constantly calculates the distance between the remote device "T" carried by the cart's user and the sensor on the cart, using triangulation, wherein the distance and direction between the cart and the cart user (i.e. golf player) may be determined, and proper instructions transmitted to the microprocessor controlled drive wheels, to properly maneuver the cart on the field of play. The control algorithm instruction is based on that feedback from the sensors 32 and 54. By knowing the distance and direction at anytime (or all the time), the computer control arrangement (CPU) 30 keeps track of the player's walking path. For short distances, the CPU instructs the cart to closely follow or precede the player's desired walking path "P", as respectively represented in FIG. 7 and FIG. 8. For longer distances, the CPU may be instructed to provide commands to go to the player on a shorter more direct path, and to follow the player within a proper distance.

The combined RF and ultrasound sensor arrangements 54 and 32 thus provides a proper feedback to the control computer (CPU) 30 so that the control computer may also further control the direction of rotation and speed of each individual drive wheel and also to avoid obstructions in the path of the cart assembly, yet still properly instructionally follow the location transmitting device through a non-linear path, if need be. Thus the modes of operation of the system of the present invention comprise: constant communication with user, the following of person "1" (user), and the trajectory followed, so the cart will avoid obstacles and not stray into the wrong territory, such as a pond, a tree or the like.

Another aspect of the present invention is that the remote device may be instructed to send the cart assembly towards the next position, for example, the next hole "H" on the golf course, via RF inputted instructions from the user's carried device "T" to the RF Transceiver on the cart 10, for communication through the CPU to the drive wheels 37. The cart assembly may also, in a further embodiment, become a push cart when the power is turned off.

The cart assembly 10 is articulable so as to be folded inwardly upon itself about its various pivot axes 22, 44 and 36, so as to be collapsible into a very compact configuration. The U-shaped handle 38 at the upper end of the parallel mid-frame members 34 may be pivoted about its transverse axis 36 so as to adjustably swing in that U-shaped handle 38 rearwardly or forwardly as necessary, or to collapse the cart assembly 10 entirely into a carryable configuration. The lower base frame 12 is foldable about its pivot arrangement 22 located along its mid-portion. The upwardly directed mid-frame members 34, having that transverse pivot axis 44 arranged about one third of the way up from the lower base frame member 12 may in itself be pivoted around that transverse pivot axis to further compact the cart assembly 10.

The entire cart assembly is ultimately graspable/carryable by the transverse pivot axis 44 arranged between the curved side bar members 35 and the upwardly directed mid-frame members 34, thus functioning as a carry handle, once the sections have been articulably folded onto themselves.

The invention claimed is:

1. A wirelessly controllable, user-directed, electrically driven, foldable four wheeled, multi-portioned frame arrangement, articulable into and from a load carryable, user preceding or user following, autonomous cart assembly system, the cart assembly system carryable by a human when the cart assembly is in a folded configuration, the cart assembly comprising:

an elongated lower base frame arrangement having a freewheeling pair of wheels on a first half-end thereof, and a pair of individually empowered individually computer controlled forward and reversibly rotatable drive wheels on a second half-end thereof;

a plurality of pivotable frame portions consisting of a "U" shaped upper handle and a pair of parallel mid-frame members extending upwardly from a pair of upwardly extending curved side bar members comprising the second half end, and wherein the first half end and the second half end of the lower base frame arrangement is foldable about a generally centrally located collapse pivot arrangement therebetween, and wherein the plurality of pivotable frame portions are pivotally connected to and foldable about one another and are hingedly attached to a transversely arranged, carry-handle-pivot-axis immovably arranged between the upper ends of the pair of curved side bar members which extend immovably upwardly from the second half end of the lower base frame arrangement, to permit the cart assembly to be folded into a compact hand-carryable configuration, carryable by the intermediately located, transversely-disposed, immovable carry-handle pivot axis; and wherein the cart assembly system includes a wireless user-tracking arrangement thereon, and wherein the wireless user-tracking arrangement has a sensor on an end of each of a pair of "L" shaped brackets, each attached to one of the parallel mid frame members, and which sensors send and receive signals so as to electronically instruct an onboard central processing unit computer to individually control the individually empowered drive wheels as to both a common or an opposite rotational direction and rotational speed from one another, to permit the cart assembly to track, sharply turn, avoid obstacles in its path by obstacle-avoiding signals sent and received by the onboard central processing unit, and otherwise promptly precede movement of or follow instructions from a system's user situated near the cart assembly.

2. The cart assembly as recited in claim 1, wherein the system includes a user-carryable wireless transponder for transmitting wireless signals about a user's location to the wireless user-tracking arrangement on the cart assembly.

3. The cart assembly as recited in claim 2, wherein the tracking arrangement comprises the sensors which includes a pair ultrasound transponders arranged to communicate positional signals with the user-carryable wireless transponder.

4. The cart assembly as recited in claim 3, wherein the tracking arrangement includes a radio frequency transceiver for providing timing for ultrasound signals utilized by the central processing unit computer in the cart assembly.

5. The cart assembly as recited in claim 4, wherein the ultrasound sensor arrangement transmits the obstacle-avoiding signals to the central processing unit computer for the cart assembly to avoid obstacles in the path of the cart assembly.

6. The cart assembly as recited in claim 3, wherein the ultrasound sensors are supported in a horizontally spaced-apart configuration on one set of frame portions to provide communicated-signal triangulation capability to the onboard central processing unit computer.

7. The cart assembly as recited in claim 1, including an independent drive motor for each drive wheel of the cart assembly.

8. A process for controlling the track, speed and direction of a collapsably foldable, central processor unit controlled, electronically motorized, individual drive wheeled, cart assembly system for use by a cart assembly user in a field of play, comprising:

arranging a pair of spaced-apart wireless ultrasound transponders on a frame portion of the cart assembly;

providing a carryable wireless location ultrasound transceiver device to a user of the cart assembly;

sending a pair of corresponding ultrasound signals from the ultrasound transponders on the cart assembly to and receiving returned back ultrasound signals from the location transceiver device carried by a user;

timing the pair of received ultrasound signals received back to the cart assembly by an onboard RF transponder;

communicating the signals received by the ultrasound transponder and the RF transponder to the central processing unit computer;

triangulating the signals so as to govern the electronic instructions to the individual drive wheels as to both their individual direction of rotation and their individual speed of rotation for the cart assembly to follow the user's instructions carrying the transponder device, and to respond to an obstacle-avoiding signal sent and received by the transponders to avoid obstacles in its path; and operating the carryable device as a remote control to instruct the cart assembly to autonomously follow a user or to procededly advance to a user-desired path or destination position.

9. The method as recited in claim 8, including:
sensing motion and direction of a remote device carried by a user of the system.

10. The method as recited in claim 8, including:
instructing drive wheels on the cart pursuant to sensed direction, speed and distance of the user carrying the remote device.

11. The method as recited in claim 10, wherein the instruction to the individual drive wheels from the central processing unit is different for each wheel.

12. The method as recited in claim 10, wherein the instruction to the individual drive wheels includes an instruction to rotate at different speed from one another.

13. The method as recited in claim 10, wherein the instruction to the individual drive wheels includes an instruction to rotate at different direction from one another.

14. A pivot-axis-grabable, hand-carryable, collapsible wheeled load carryable autonomously mobile cart assembly system for autonomously preceding the desired path or following the path of a user, the cart assembly comprising:
   an articulable lower frame foldable onto itself about a mid-lower frame-located collapse-pivot-arrangement, the lower frame having two independently empowered drive wheels at a rear end thereof;
   an articulable upper frame connected to the rear end of the lower frame, the articulable upper frame consisting of a pair of curved side bar members fixedly connected to a rear axis at a lower rear end thereof, and to one another at an upper end thereof by a transversely-disposed, immovable, cart-assembly-carry-handle pivot-axis, onto which carry-handle-pivot-axis, a pair of articulable mid-frame members are hingedly attached, which mid-frame members pivotally support a "U" shaped upper handle, and from which pair of mid-frame members, a first and a second sensor transponder arrangement are also respectively supported; and
   a central processing unit on the cart assembly to instruct the empowered drive wheels as to individual rotational requirements as to each individual first and second drive wheel's speed of rotation and each individual first and second drive wheel's common direction of rotation or each individual first or second drive wheel's sharp-U-turn-inducing opposite direction of rotation from its adjacent second or first drive wheel's direction of rotation upon receipt of the central processing unit receiving time, direction and distance information from the first and second sensor transponder arrangement, and signal transmission/receiving by the central processing unit to enable processing of such signals received to avoid obstacles in a path of the mobile cart assembly.

15. The cart assembly system as recited in claim 14, including a user carryable handset for receiving and for transmitting position signals with respect to the user and the cart assembly.

16. The cart assembly as recited in claim 15, wherein the first sensor arrangement consists of a pair of spaced apart ultrasound signal transponders for communication with an ultrasound transponder in the carryable handset.

17. The cart assembly as recited in claim 15, wherein the first sensor arrangement consists of an RF signal transponder in communication with an RF transponder on the carryable handset.

18. The cart assembly as recited in claim 17, wherein the RF signal transponder in the cart assembly provides a time stamp instruction to the ultrasound signals communicated to the central processing unit in the cart assembly.

* * * * *